June 24, 1924.

G. T. MIDBY 1,499,241

HEATER AND VENTILATOR FOR AUTOMOBILES AND OTHER VEHICLES

Filed Feb. 13, 1923

Inventor:
Geo. T. Midby.
E. W. Anderson
Attorneys.

Patented June 24, 1924.

1,499,241

UNITED STATES PATENT OFFICE.

GEORGE T. MIDBY, OF SEATTLE, WASHINGTON.

HEATER AND VENTILATOR FOR AUTOMOBILES AND OTHER VEHICLES.

Application filed February 13, 1923. Serial No. 618,879.

*To all whom it may concern:*

Be it known that I, GEORGE T. MIDBY, a citizen of the United States, resident of Seattle, in the county of King and State of Washington, have made a certain new and useful Invention in Heaters and Ventilators for Automobiles and Other Vehicles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
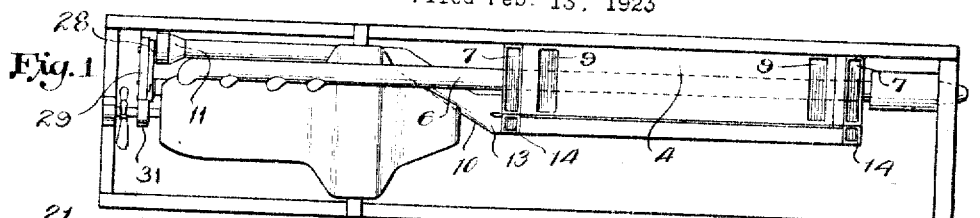
Figure 1 is a plan view of the frame of an automobile, equipped with my invention.
Figure 2:
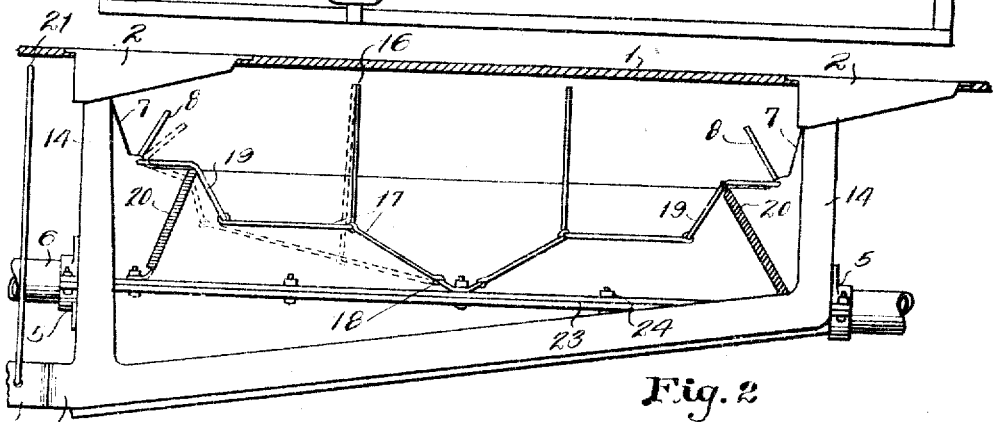
Figure 2 is a side view of the heating chamber.
Figure 3:
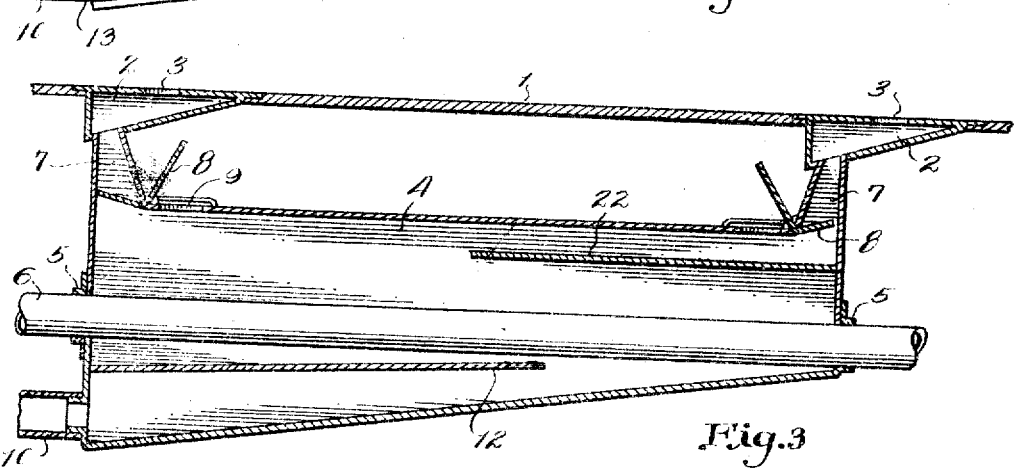
Figure 3 is a section taken on the line 3—3, Figure 4.
Figure 4:
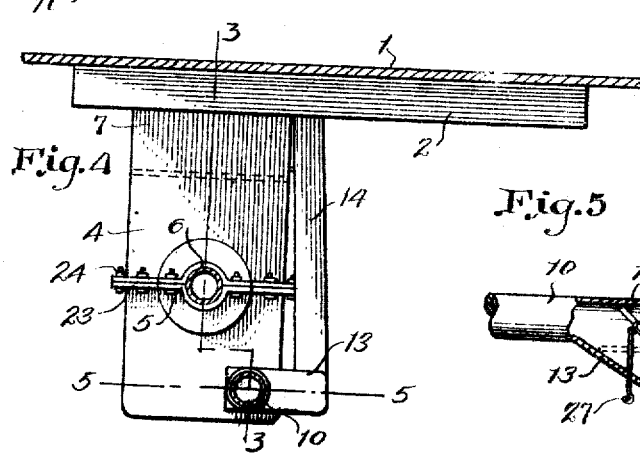
Figure 4 is a front end view of the heating chamber.
Figure 5:
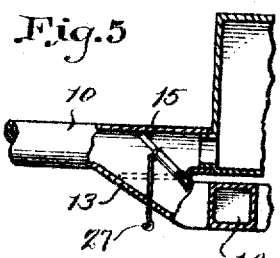
Figure 5 is a detail fragmentary section taken on the line 5—5 Figure 4.

The invention has relation to heating and ventilating means for automobiles, power boats or other vehicles driven by an explosive engine or by steam, having for an object to provide means for utilizing heat from the exhaust from the motor, and a current of cold air set up by the motion of the vehicle and drawn from the uncontaminated air forward of the vehicle, for heating and ventilating purposes, and in such proportions as may be desired.

The invention consists in the novel construction and combinations of parts, as hereinafter set forth.

In the accompanying drawings, illustrating an embodiment of the invention, the numeral 1 designates the floor of a motor car, in which is set a transverse heating duct or chamber 2, having its top flush with said floor and provided with an exit opening or openings 3 for the heated air. Located below the horizontal duct 2 is a supply chamber 4, surrounding the exhaust pipe 6 from the engine and attached thereto at 5, the heat from the exhaust, radiated within the chamber 4, rising therein and being delivered at the top thereof to the transverse duct 2, through a passage of an upstanding extension 7 at one end of the supply chamber. The passage 7 has a valve 8 controlling the same and adapted either to close the passage and uncover a damper opening 9 in the top of the chamber 4, leading to the outer air, or to open said passage and close the opening 9, the valve being also adapted for adjustment to partially close said passage or said opening, to admit more or less of the heated air to the duct 2 and to permit more or less of the same to escape to the outer air, as may be desired according to the weather or other conditions to be met.

Connected also with the chamber 4, forwardly thereof, is a cold air intake pipe 10, having one end 11 thereof extending well forward and screened and enlarged to take in uncontaminated air forwardly of the vehicle. Preferably a fan 27, supported upon intermediately pivoted arm 28, is adapted to be lowered into the end 11 of the air intake pipe, a drive belt 29 extending from the fan hub to a pulley 30 mounted upon the opposite end of arm 28, whereby the belt is brought into contact with the radiator fan belt 31 whenever the fan 27 is brought into operating position. The fan is secured in or out of operating position by means of adjusting arm 32, and the arm 28 is preferably made in sections and provided with a belt-tightening device 33.

A baffle plate or partition 12 is provided between the exhaust pipe and cold air intake pipe opening to chamber 4, the latter being preferably below the exhaust pipe and the baffle plate placed horizontally therebetween and inclined slightly upwardly from front to rear, as is also the bottom of said chamber.

The cold air intake pipe 10 is provided in rear thereof with a branch 13 leading to or communicating with a vertical cold air duct 14, the latter at its upper end communicating with chamber 2, a valve 15 being adapted either to close said branch 13 or to open the same and close the pipe 10. By adjustment of said valve the cold air may be delivered either at the bottom of the chamber 4, as may be requisite in cold weather, or directly to the chamber 7, irrespectve of whether the valve 8 closes passage 7 or not, as would be desirable in warm weather, when the invention is designed to function for ventilating purposes. Or, in the latter case, the valve 8 may be partially opened to admit a regulated supply of warm air to the supply chamber.

In order to adjust the valve 8, any suitable means may be provided, as for instance an operating cord 16, for toggle links 17, one of the latter having a pivotal connection 18 with the casing of chamber 4 or other stationary part, the other of said links having an operating connection with one end of a bowed link 19, the other end of said bowed link being fast to the pivot of said valve so that, the link 19 being moved, the valve will be adjusted. A coiled spring 20 is connected with the link 19, and the tension thereof normally holds the valve 8 in position to open the passage 7. The valve 15 is also provided with suitable means of operation, as for instance an operating cord 21. As shown, the cords 16 and 21 are connected to the lower ends of adjusting rods 25, lying along the steering post and maintained in adjusted position by spring 26.

The transverse heating duct or chamber 2 is shown as provided in duplicate, as is also the passage 7, the valve 8, the opening 9 and the vertical air duct 14, for use with automobiles or vehicles having more than one seat, and in such cases a baffle plate or partition 22 is used to act in conjunction with the baffle plate 12, for better admixture of the hot and cold air.

For convenience in attachment upon the exhaust pipe, the supply chamber 4 is preferably made in two sections, i. e., upper and lower sections, having a meeting line 23 and held together by removable fastening devices 24.

The invention is intended to take the place of the inefficient foot heaters so commonly used, and to provide a convenient means of heating without cost.

I claim:—

1. In means for heating motor vehicles, a car having a floor provided with an opening a hollow casing the chamber of which entirely surrounds and extends both above and below the exhaust pipe from the engine of the automobile, a baffle in said chamber below said exhaust pipe, a cold air supply pipe delivering to the bottom of said chamber below said baffle, a baffle in said chamber above said exhaust pipe, said casing being provided at one end with an upstanding top extension having a passage leading to said floor opening, the top of said casing being spaced from the floor of the car and provided with an opening to the outer air adjacent said extension, and a valve in said extension controlling said passage and said outer air opening.

2. In means for heating motor vehicles, a car having a floor provided with an opening a hollow casing the chamber of which entirely surrounds and extends both above and below the exhaust pipe from the engine of the car, a baffle in said chamber below said pipe, a cold air supply pipe delivering to the bottom of said chamber below said baffle, a baffle in said chamber above said exhaust pipe, said casing being provided at one end with an upstanding top extension having a passage leading to said floor opening, the top of said casing being spaced from the floor of the car and provided with an opening to the outer air adjacent said extension a valve in said extension controlling said passage and said outer air opening, said cold air pipe having an upstanding branch adjacent said casing the floor of the car having also an opening independent of said valve said branch leading to said last named opening, and a valve in said branch controlling the same and the main cold air supply pipe.

3. In means for heating motor vehicles, a car having a floor provided with openings spaced apart a hollow casing the chamber of which entirely surrounds and extends both above and below the exhaust pipe from the engine of the car, a baffle in said chamber below said pipe, a cold air supply pipe delivering to the bottom of said chamber below said baffle, a baffle in said chamber above said exhaust pipe, said casing having at each end an upstanding top extension having a passage leading to one of said spaced floor openings, the top of said casing being spaced from the floor of the car and provided at each end with an opening to the outer air adjacent the related upstanding extension, and a valve in each extension controlling the passage thereof and the related outer air opening, and unitary means for operating both valves.

In testimony whereof I affix my signature in presence of two witnesses.

GEORGE T. MIDBY.

Witnesses:
C. L. NELSON,
P. A. PEDERSEN.